United States Patent
Campbell

(10) Patent No.: US 8,003,552 B2
(45) Date of Patent: Aug. 23, 2011

(54) POLYASPARTIC POLYURETHENE APPLICATIONS IN COMPOSITE INDUSTRY

(76) Inventor: Matthew T. Campbell, Oxford, MI (US)

( * ) Notice: Subject to any disclaimer, the term of this patent is extended or adjusted under 35 U.S.C. 154(b) by 0 days.

(21) Appl. No.: 12/747,672

(22) PCT Filed: Dec. 11, 2008

(86) PCT No.: PCT/US2008/086395
§ 371 (c)(1),
(2), (4) Date: Jun. 11, 2010

(87) PCT Pub. No.: WO2009/076516
PCT Pub. Date: Jun. 18, 2009

(65) Prior Publication Data
US 2010/0285270 A1 Nov. 11, 2010

Related U.S. Application Data

(60) Provisional application No. 61/012,834, filed on Dec. 11, 2007.

(30) Foreign Application Priority Data

Dec. 11, 2008 (WO) ............... PCT/US2008/086395

(51) Int. Cl.
B32B 3/00 (2006.01)
(52) U.S. Cl. .......... 442/59; 442/168; 442/179; 442/180; 428/295.1; 428/297.4

(58) Field of Classification Search ............... 428/295.1, 428/297.4; 442/59, 168, 179, 180
See application file for complete search history.

(56) References Cited

U.S. PATENT DOCUMENTS

| | | | |
|---|---|---|---|
| 4,254,010 A | 3/1981 | Mizuno et al. | |
| 4,943,237 A * | 7/1990 | Bryan | 433/213 |
| 5,623,045 A * | 4/1997 | Zwiener et al. | 528/68 |
| 5,885,474 A | 3/1999 | Reiners et al. | |
| 6,129,378 A * | 10/2000 | Goto et al. | 280/732 |
| 6,399,736 B1 * | 6/2002 | Primeaux et al. | 528/84 |
| 6,605,343 B1 * | 8/2003 | Motoi et al. | 428/298.1 |
| 6,767,987 B2 * | 7/2004 | Okazaki | 528/310 |
| 7,022,270 B2 * | 4/2006 | Maybee | 264/35 |
| 7,195,695 B2 | 3/2007 | Sears et al. | |
| 2003/0219561 A1 * | 11/2003 | Maybee | 428/36.91 |
| 2005/0059791 A1 | 3/2005 | Roesler et al. | |
| 2010/0285270 A1 * | 11/2010 | Campbell | 428/114 |

FOREIGN PATENT DOCUMENTS

| | | |
|---|---|---|
| EP | 1038897 A2 | 9/2000 |
| WO | WO-2007039133 A1 | 4/2007 |
| WO | WO-2009076516 A2 | 6/2009 |

* cited by examiner

Primary Examiner — Newton O. Edwards
(74) Attorney, Agent, or Firm — Gifford, Krass, Sprinkle, Anderson & Citkowski, P.C.

(57) ABSTRACT

A freestanding article is provided that uses a cured polyaspartic acid urethane resin to form a hardened matrix impregnating and surrounding a cloth having parallel fibers. This resin provides an article with superior mechanical and weathering properties relative to conventional resins such as epoxies and vinyl esters.

12 Claims, 1 Drawing Sheet

US 8,003,552 B2

POLYASPARTIC POLYURETHENE APPLICATIONS IN COMPOSITE INDUSTRY

CROSS-REFERENCE TO RELATED APPLICATIONS

This application claims priority of U.S. Provisional Patent Application Ser. No. 61/012,834 filed Dec. 11, 2007, which is incorporated herein by reference.

FIELD OF THE INVENTION

The present invention in general relates to articles formed from aligned fibers in a cured resin matrix and in particular to such articles having a polyaspartic acid urethane matrix.

BACKGROUND OF THE INVENTION

The use of an aligned fiber sheet impregnated with curable resin is a well-established technique to form articles with high strength to weight ratios. Stress skin articles formed through the use of an aligned fiber sheet impregnated with curable resin illustratively include boat hulls, vehicle body panels, aircraft components, missile components, surfboards, prosthetics, and the like. Unfortunately, combinations of aligned fibers with conventional monomers and resins cross linking to form thermoset polymers have failed to afford a package of completely desirable properties. Prototypical of such aligned fiber sheet systems is fiberglass impregnated with curable epoxy resins. Limitations in the use of such articles are article performance and production techniques.

The incomplete ability of resin to wet a fiber leads to reduced pull out energy from the fiber from a cured resin matrix resulting in lower article strength. As curable resins are most often hydrophobic, silanization or other modification of glass fibers is accomplished to render the glass hydrophobic. While this is costly, it is effective to increase article strength; however, many fiber materials are either damaged or otherwise not amenable to surface modification to change fiber surface energies. High strength fibers such as carbon and aramid are representative of fibers that are comprised by certain surface treatments. Existing resins also suffer from erratic cure profiles, susceptibility of cure to ambient moisture and light, and article yellowing after cure upon exposure to sunlight.

The toxicity, odor, and other negative handling attributes of resins have also limited the application for aligned fiber containing cured matrix articles. As an ever increasing number of resins are found to have toxicity even in cured articles, the applications have accordingly diminished for fiber containing cured matrix materials. Additionally, the increased requirements on curing environment, worker safety and ventilation further limit the locations of usage. This has had a particularly large impact on field repair of articles.

Thus, there exists a need for an oriented fiber reinforced thermoset material having improved performance, handling, and weatherability relative to conventional resins.

SUMMARY OF THE INVENTION

Figure 1:
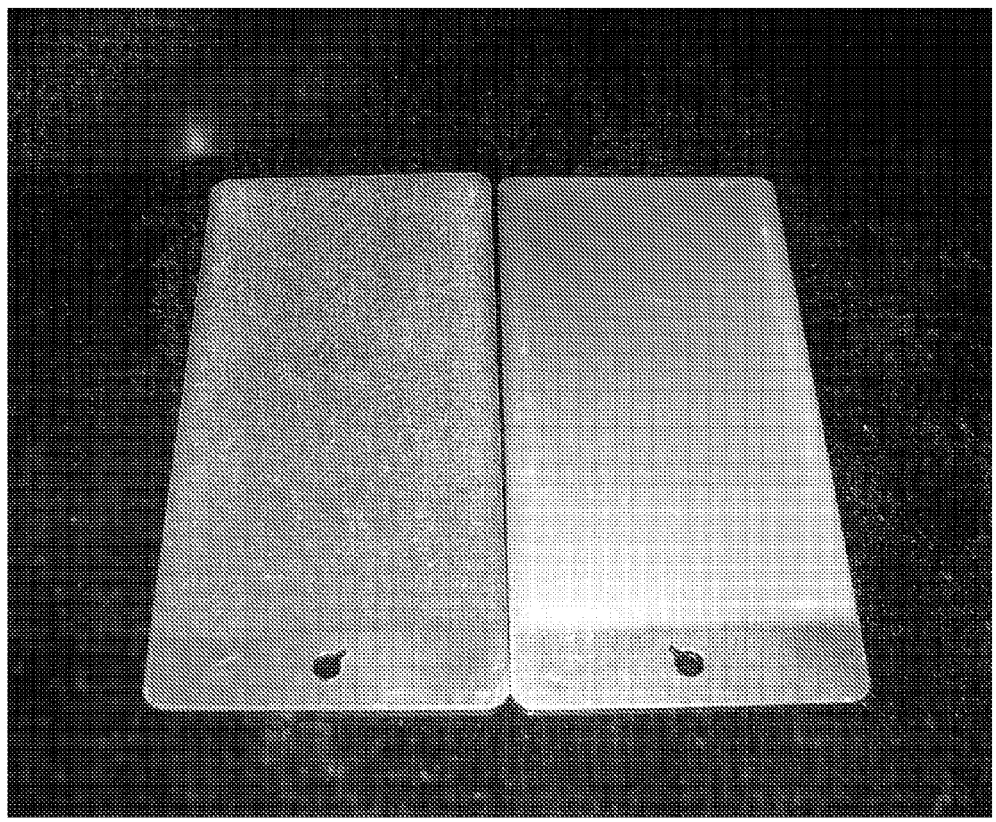
FIG. 1 is photographic images of an inventive cured polyaspartic acid urethane on a test strip (right) and a like thickness convention cured epoxy after six months of simulated aging.

A freestanding article is provided that uses a cured polyaspartic acid urethane resin to form a hardened matrix impregnating and surrounding a cloth having parallel fibers. This resin provides an article with superior mechanical and weathering properties relative to conventional resins such as epoxies and vinyl esters.

DETAILED DESCRIPTION OF THE INVENTION

The present invention has utility as an oriented fiber reinforced thermoset resin article. The present invention in resorting to a polyaspartic acid urethane thermoset precursor that is conventionally used in forming protective floor coatings, oriented fiber reinforced freestanding articles are produced having superior flexural and weathering characteristics relative to conventional resins used to wet oriented fiber cloths. The use of this resin system as a cure matrix for oriented fiber cloths shows an attractive set of properties relative to conventional resins such as epoxies for the formation of freestanding articles such as boat hulls, vehicle body panels, aircraft components, missile components, surfboards, and prosthetics. An inventive polyaspartic acid urethane is appreciated to also be beneficial as a tie coat between dissimilar polymers which otherwise have poor adhesion. An inventive polyaspartic acid urethane is appreciated to also be beneficial as a tie coat between dissimilar polymers which otherwise have poor adhesion.

The production of polyaspartic acid urethane from a two-part mixture of a polyisocyanate component and an isocyanate reactive polyaspartic ester and a polyketamine is detailed in U.S. Pat. No. 5,623,045 and specifically at column 3, line 2-column 6, line 35. Upon mixing of the polyisocyanate with an isocyanate reactive polyaspartic acid ester and polyketamine part B, cross linking occurs to produce urethane linkages. According to the present invention, a polyisocyanate part A preferably has an NCO content of between 10 and 25 total polyisocyanate polymer weight percent and a molecular weight of between 1000 and 10,000. Polyisocyanates operative herein illustratively include aliphatic polyisocyanates such as hexamethylene-1,6-diisocyanate, 2,2,4-trimethyl-hexamethylene-1,6-diisocyanate; alicyclic polyisocyanates such as cyclohexane-1,4-diisocyanate, dicyclohexyl-methane-4,4'-diisocyanate, aryl polyisocyanates such as p-phenylene diisocyanate, toluene-2,4-isocyanate, and diphenyl methane 2,4'-diisocyanate. Additionally, an isocyanate operative herein includes polyphenylene polymethylene polyisocyanate derived from condensation of aniline and formalin, liquidified diphenylmethane diisocyanates containing carbodiimide groups or uretonimine groups, modified polyisocyanates containing at least one urethane group, allophanate group, biuret group or uretodione group. Other isocyanates operative herein are modified polyisocyanates containing urethane groups, allophanate groups or uretodione groups such that the polyisocyanates are liquid at the ambient temperature such as 20° C. Hexamethylene diisocyanate based polyisocyanates are representative of polyisocyanates operative herein.

The part B reactive polyaspartic acid ester with the polyisocyanate has the formula:

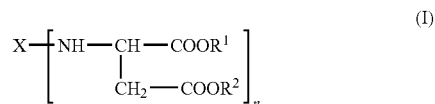

where X represents an n-valent radical which is inert towards isocyanate groups and obtained by removing the primary amino groups from an organic polyamine having a number average molecular weight ($M_n$) of 60 to 6000 and containing n (cyclo)aliphatically bound amino groups; $R^1$ and $R^2$ represent the same or different alkyl radicals having 1 to 18 carbon atoms; and n represents a whole number of at least 2. Preferably, n is an integer of between 2 and 1000. $R^1$ and $R^2$ are linear, branched or cyclic allyls. A cyclic allyl is appreciated to also include a combination of a cyclic portion with a linear or branched portion. Polyamine precursors operative in the present invention illustratively include diamines such as $C_2$-$C_{24}$ linear aliphatic diamines, $C_2$-$C_{24}$ branched aliphatic diamines, and aryl diamines and polymer backbones having the amines extending therefrom; and triamines such as aliphatic alkylene oxide triamines. Specific amines operative herein include iso-octyl amine; 1,12 dodecadiamine; diethyl toluene diamine; and polyoxypropylenetriamine (PPD) having a molecular weight of from 200 to 5,000, with 200 to 600 being preferred. Preferably, the present invention incorporates as an amine component a triamine. Polyamine precursors operative herein have a molecular weight of between 120 and 5,000 Daltons. Preferably, a triamine of the present invention has a molecular weight of 200 to 600. Most preferably, a triamine precursor of the present invention has a molecular weight of about 400 Daltons. It is appreciated that a polyamine precursor that is a mixture of diamine, multiple diamines, and triamines is also operative herein. In a mixed amine component, preferably, the diamine of the present invention has a lower molecular weight of between 200 and 2,500 Daltons and the triamine has a higher relative molecular weight of between 200 and 5,000 Daltons. It is appreciated that a triamine present in combination with a diamine will provide branched polyureas that will form higher viscosity thickening. When a triamine is present it is typically provided in a stoichiometric ratio relative to a diamine of 0.01-25:1.

An additional optional component on the B side is a polyketamine of the formula:

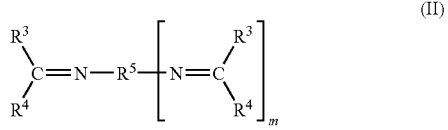

(II)

wherein $R^3$ and $R^4$ may be the same or different and represent inert organic radicals such as hydrocarbon radicals having up to 8 carbon atoms, preferably alkyl radicals having 1 to 8 carbon atoms, or the radicals $R^3$ and $R^4$, together with the carbon atom, may form a 5- or 6-membered cycloaliphatic ring; $R^5$ represents an (m+1)-valent radical, obtained by removing the primary amino groups from a polyamine having a number average molecular weight ($M_n$) of 88 to 2000, having (cyclo)aliphatically bound amino groups and optionally containing oxygen and/or nitrogen atoms; and m is 1 to 3. Suitable polyamine precursors to a polyketamine of the present invention include those operative to form (I).

The relative ratio of polyaspartic acid ester (I) to polyketamine (II) typically ranges in a weight ratio of I:II of 90:10 to 10:90 and preferably 80:20 to 20:80. More preferably, the moiety ratio of isocyanate groups to isocyanate-reactive groups found in the B side is between 0.8:1 and 2:1 and preferably between 0.8:1 and 1.4:1.

It is appreciated that the cross-linkable resin according to the present invention optionally includes a solvent to facilitate spreading and wetting of a parallel fiber mat. Suitable solvents compatible with an inventive resin illustratively include ethyl acetate, butyl acetate, methoxypropyl acetate, methyl isobutyl ketone, xylene, N-methylpyrrolidone, petroleum ethers and combinations thereof. Preferably, a minimal or non-volatile organic content (VOC) resin formulation is used to facilitate indoor usage and limit respiratory complications associated with application or contact with a subsequently cured product. It is appreciated that an inventive resin is amenable to inclusion with conventional resin additives illustratively including pigments, fillers, plasticizers, catalysts, and antioxidants.

Upon combining A and B parts of an inventive resin, the resin is readily applied to a parallel fiber mesh by a known application technique such as spraying, brushing, dipping and applying with the use of rollers or doctor blades. Without intending to be limited to a particular theory, it appears that as-produced glass fiber and carbon fiber cloths both have stronger surface attraction to the resultant polyaspartic acid urethanes resulting in improved mechanical properties. This is further detailed in the following exemplary examples. Preferably the inventive resin is applied in an uncured state onto fiber cloths in an amount of between 0.6 to 1.5 parts by weight resin per part by weight of aligned fiber cloth.

In order to evaluate the properties of an inventive polyaspartic acid cured urethane, a series of tests were performed relative to a corresponding epoxy cure technology known to provide high strength composites with parallel fiber materials. Polyester and vinyl ester resins are not considered equivalent as they lack all of the desirable qualities of an epoxy. Properties of an inventive composite are further detailed in the following nonlimiting examples.

EXAMPLE 1

Inventive Resin

A polyisocyanate part A contains a homopolymer of hexamethylene diisocyanate (CAS No. 28182-81-2) having an NCO content of 18% and a viscosity of 700 megapascal.seconds at room temperature. Part B includes a polyaspartic ester according to Formula I formed from the condensation of 1 mole of 4,4'-diaminodicyclohexylmethane and 2 moles of diethylmalate having an equivalent weight of 280 grams per amine and a viscosity of 1500 megapasal.seconds at room temperature. Part B also includes a ketamine formed from the condensation of 1-amino-3,3,5-trimethyl-5-5-aminomethyl-cyclohexane and 2 moles of methyl isobutyl ketone having an equivalent weight of 167 grams and a weight ratio of polyaspartic ester to polyketamine of 3:1. The parts A and B are mixed in an equivalent ratio of 1 between isocyanate groups of part A and groups reactive therewith from part B. Upon mixing of parts A and B, the uncured resin is applied to cloths as detailed below.

COMPARATIVE EPOXY FORMULATION EXAMPLE

Resin Research Project's 21 System was used as a comparative and is bisphenol A based epoxy resin with a modified cycloaliphatic amine curing agent. The epoxy resin was handled and cured per manufacturer specifications. The resin is a bisphenol A resin based epoxy resin, modified cycloaliphatic amine curing agent system designed primarily for marine composite use. The physical state of the resin before cure is medium viscosity water white to pale yellow liquid with a Color (Gardner) of 1 to 3. Physical properties of this resin after cure at 20° Celsius as measured two weeks after cure are provided in Table 1.

TABLE 1

| Comparative Epoxy Physical Properties | |
| --- | --- |
| Resin/hardener | 2000/2100 |
| Mix by Volume | 2 to 1 |
| Mix by Weight | 100 to 45 |
| Tensile Strength | 9,800 |
| Tensile Modulus | 405,000 |
| Flexural Strength | 14,800 |
| Flexural Modulus | 480,000 |
| Barcol Hardness | 83 |
| HDT | 122F |
| Compression Yield | 15,400 |
| Elongation % | 3.8 |

EXAMPLE 2

Flex Out and Rate of Return

Ten strips that were 2.54 centimeters (cm) by 31.2 cm were laid up with 1 layer of 170 gram S-fiberglass cloth sandwiched with 1 layer of 114 gram S-fiberglass cloth, five each per Example 1 and Comparative Epoxy Example. The thickness was measured to be within 0.0025 cm for accuracy of the test. This is typical for the surfboard industry or other thin laminations in other industries where weight, strength, and performance are at a premium. The test was performed horizontally with a scale at one end to measure in grams. The 5 strips from each group were flexed to 8.9 cm noting the amount of weight required to achieve this flexure. Grams of weight to achieve 8.9 cm of flexure.
Comparative epoxy: 95, 95, 85, 80, 75
Inventive polyaspartic urethane: 105, 140, 105, 105, 125

EXAMPLE 3

Flex Out Deformation

Strips of 2 layers of 170 gram S-fiberglass cloth and 4 layers of 114 gram S-fiberglass cloth were laminated together, five each per Exhibit 1 and Comparative Example. Test strips were 2.54 cm by 31.2 cm by 0.15 thick. Test strips were flexed to 12.7 cm apart end to end then measured on a flat surface for deformation. Then the strips were measured 30 minutes later to see if they were still deformed.
Comparative epoxy: 0.64 cm, 0.95 cm, 0.79 cm, 0.56 cm, 0.95 cm, 6/16"
Inventive polyaspartic urethane: 0, 0, 0.03 cm, 0.03 cm, 0.

EXAMPLE 4

Torsional Twist Deformation

Ten strips per Example 3 were used, five each per Exhibit 1 and Comparative Example. Strips were tested by twisting one end 120 degrees. The strips were measured in degrees of deformation.
Comparative epoxy: 18, 21, 10, 25, 16
Inventive polyaspartic urethane: 1, 0, 3, 2, 1

EXAMPLE 5

Flex Out to Cracking and Then to Failure

Ten test strips are the identical glass schedule of Example 3 with exception of length being 15.24 cm. The strips were put into a vise and measured until cracking occurred and then at lamination failure in which one or more laminates within the strip broke in half.
Comparative epoxy cracking: 10.80 cm, 10.16 cm, 11.11 cm, 10.32 cm, 10.48 cm
Inventive polyaspartic cracking: 6.35 cm, 6.67 cm, 6.35 cm, 6.67 cm, 5.40 cm
Comparative epoxy failure: 8.57 cm, 7.62 cm, 8.26 cm, 8.26 cm, 7.95 cm
Inventive polyaspartic failure: 6.19 cm, 6.35 cm, 6.67 cm, 6.35 cm, 5.08 cm

EXAMPLE 6

Cosmetic Discoloration from UV Light and Weather

Samples of inventive resin and epoxy resin per Example 1 and Comparative Epoxy Example were cured to a like thickness on aluminum test strips and were put into a weather cabinet for 24 hours. The cabinet stimulates weather aging at a timeframe of 6 months.

FIG. 1 shows images of inventive polyaspartic urethane (right) and the comparative epoxy (left) after simulated weathering. A discoloration of the epoxy test strip is noted while the inventive test strip cured resin is visually unchanged.

EXAMPLE 7

Comparison to Vinyl Ester Resin

The tests of Example 2 are repeated with a cured vinyl ester resin comparative that is 66.5 weight percent vinyl ester resin in styrene with a cobalt curative and commercially available as HYDREX 100-HF from Reichhold Inc. This comparative had a performance comparable to the Example 2 epoxy resin.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. An article comprising:
   a parallel fiber cloth; and
   a cured polyaspartic acid urethane resin impregnating said cloth;
   said cloth with impregnated resin when said cloth is fiberglass having a physical property of:
   (i) a flexure of 8.9 centimeters requiring 105 to 140 grams at a length of 31.2 centimeters; or
   (ii) a post-120 degree twist deformation of 3 degrees or less at a length of 31.2 centimeters.
2. The article of claim 1 wherein said cloth is fiberglass.
3. The article of claim 1 wherein said cloth is polyamide.
4. The article of claim 1 wherein said cloth is carbon fiber.
5. The article of claim 1 wherein said cloth is formed as a surfboard.
6. The article of claim 1 wherein said cloth is formed as a boat component.
7. The article of claim 1 wherein said cloth is formed as a prosthetic.

8. The article of claim 1 wherein said cloth is formed as a vehicle body component.

9. The article of claim 1 further comprising a plurality of parallel fiber cloths, wherein each of said plurality of cloths is independently fiberglass, polyamide, or carbon fiber.

10. The article of claim 1 wherein said resin has hexamethylene subunits.

11. The article of claim 1 wherein said resin is present from 0.6 to 1.5 parts by weight per part of weight of said cloth.

12. The article of claim 1 wherein said resin has at least one additive of a pigment, a filler, a flow aid, a plasticizer, a catalyst, or an antioxidant.

* * * * *